United States Patent
Mutalik

Patent Number: 5,819,297
Date of Patent: Oct. 6, 1998

[54] METHOD AND APPARATUS FOR CREATING RELIABLY DUPLICATABLE TAPE VOLUMES WITHOUT COPYING ANY PADDING

[75] Inventor: Madhay G. Mutalik, Northboro, Mass.

[73] Assignee: EMC Corporation, Hopkinton, Mass.

[21] Appl. No.: 534,433

[22] Filed: Sep. 27, 1995

[51] Int. Cl.$^6$ .................................................. G06F 17/30
[52] U.S. Cl. ........................... 707/205; 707/204; 360/48
[58] Field of Search ................................... 395/600, 425, 395/438, 727; 360/48, 72.1, 50; 340/146.1; 380/4; 396/311; 400/63; 707/203, 204

[56] References Cited

U.S. PATENT DOCUMENTS

| | | | |
|---|---|---|---|
| 3,620,476 | 11/1971 | Cervantes | 360/15 |
| 3,711,844 | 1/1973 | Irwin | 360/48 |
| 3,744,803 | 7/1973 | Bazzy | 360/15 |
| 3,805,284 | 4/1974 | Coon et al. | 360/15 |
| 3,913,721 | 10/1975 | Koplow et al. | 400/63 |
| 3,918,027 | 11/1975 | Lechner | 340/146.1 |
| 4,176,380 | 11/1979 | Koski et al. | 360/50 |
| 4,422,111 | 12/1983 | Moeller et al. | 360/72.1 |
| 4,587,575 | 5/1986 | Odagiri et al. | 360/15 |
| 4,882,637 | 11/1989 | Dourland et al. | 360/16 |
| 5,109,413 | 4/1992 | Comerford et al. | 380/4 |
| 5,155,849 | 10/1992 | Westfall et al. | 707/203 |
| 5,200,864 | 4/1993 | Dunn et al. | 360/48 |
| 5,210,850 | 5/1993 | Kato et al. | 395/727 |
| 5,258,855 | 11/1993 | Lech et al. | 358/462 |
| 5,274,508 | 12/1993 | Tan et al. | 360/48 |
| 5,280,600 | 1/1994 | Van Maren et al. | 395/425 |
| 5,287,478 | 2/1994 | Johnston et al. | 395/438 |
| 5,294,949 | 3/1994 | Robison et al. | 396/311 |
| 5,355,259 | 10/1994 | Shih | 360/48 |
| 5,384,669 | 1/1995 | Dunn et al. | 360/48 |
| 5,394,534 | 2/1995 | Kulakowski et al. | 711/112 |
| 5,404,508 | 4/1995 | Konrad et al. | 707/202 |
| 5,406,425 | 4/1995 | Johnson et al. | 360/48 |
| 5,502,811 | 3/1996 | Ripberger | 395/182.04 |
| 5,581,458 | 12/1996 | Richmond | 364/141 |
| 5,592,342 | 1/1997 | Hall et al. | 360/48 |

OTHER PUBLICATIONS

"Superdense Optical Storage", IEEE Spectrum, v32, n.8, pp. 25–31, Aug. 1995.

Collinson, Peter "Archiving and Dumping", EXE, Aug. 1993, v8, n3, p. 70(4).

Carter, E.F., Jr. "Generating and application of random numbers", IEEE/Inspect Database Updates and Additions, Abstract, Jan. 5, 1994.

Gianatasio, David "Utility Lets IBM Tapes Write from VAXes", Digital Review, v5, n21, p. 18(1), Nov. 7, 1988.

Primary Examiner—Thomas G. Black
Assistant Examiner—Charles L. Rones
Attorney, Agent, or Firm—Maureen Stretch

[57] ABSTRACT

Method and apparatus for creating reliably duplicatable tape volumes by padding the volume label on the source volume with compression resistant random data, and copying such a source volume to a tape volume that does not have padding. In a preferred embodiment, the application program creating the source volume uses the present invention to create the padding on the source volume. The amount of padding to be inserted can be specified either as a fixed amount, or as a dynamically variable parameter changed on the basis of statistically significant results sampling. When a padded source volume is then duplicated to another tape, without padding, the likelihood that the source data will "fit" on the unpadded destination volume becomes much more predictable.

8 Claims, 4 Drawing Sheets

METHOD AND APPARATUS FOR CREATING RELIABLY DUPLICATABLE TAPE VOLUMES WITHOUT COPYING ANY PADDING

BACKGROUND OF THE INVENTION

This invention relates generally to systems for duplicating magnetic tape, and more particularly to a method and apparatus for creating reliably duplicatable magnetic tape media.

When creating magnetic tape volumes, in such applications as database backups, the conventional approach has been to write a volume label, which identifies the tape and usually its characteristics, then write a filemark, (also known as a tape mark) and then fill the tape with data up to the Logical End Of Tape (LEOT). In most magnetic tape recording systems the LEOT is a physical mark placed on the back of the tape, before the Physical End of Tape (PEOT). When the LEOT is sensed by the tape drive and conveyed to the input/output system controlling the tape, the input/output system typically writes a trailer label or a filemark and performs end of volume processing.

When duplicating such a tape volume to another volume of "identical" media type, and length, theoretically there should be no problem. However, if the destination drive is dirty or its heads are worn, writes to the destination volume will fail. When this occurs, in many tape systems the tape is backed up and the area where the write failed is erased. Then the tape system skips the failed area and goes to a next section of the destination tape to attempt the write. If several failures such as this occur, the destination tape volume will eventually have a number of "skipped" areas, and so will require more physical space to record the source data, than the source volume used. Thus, the duplicating effort may fail, if the resulting amount of available space on the destination volume is less than is needed to copy the source.

Another type of failure can occur when output streaming is used. Some source tapes are created in streaming mode, in which data is constantly being written to the tape without stopping. When duplicating a tape created in streaming mode, the duplicating operation needs enough priority and power in the system to read the source data and write the destination volume fast enough to keep both input and output streaming. If the destination tape drive has to stop and start, because other applications interrupt with higher priority tasks during the copying operation, or because copying is done on a less powerful computer incapable of sustaining prolonged streaming, gaps will occur on the destination volume, thus requiring more physical space on the tape. Thus, even if the conditions are ideal for minimizing physical write errors, gaps caused when streaming is interrupted can still cause the overall copying operation to fail.

Thus, a duplication may succeed if the number of rewrites on the destination tape is fewer than the number that occurred on the source tape, or if there is sufficient headroom between LEOT and physical end of tape (PEOT) for the particular medium type, or if there is enough power and priority to do streaming without adding gaps. If one or more of these conditions is not met, the duplication may fail. Failures are dependent on many conditions, including not only volume size, drive conditions, and output streaming percentage, but tape technology and other factors. Failure rates may vary from a 5% failure of all duplication attempts to as high as 50% failure of all attempts.

In one informal study conducted by applicant at a test installation, 7 failures occurred in 20 attempts to duplicate a tape. In this study, each tape could require as much as 6 hours to be duplicated, since tapes are capable of holding 10–20 gigabytes or more of data. One vendor of tape duplication products states in its technical bulletin that "slight manufacturing irregularities in tapes can cause two apparently identical tapes to have different capacities . . . [their product] can only copy 100% correctly if the destination tape is greater than or equal to the size of the source tape, and if you use two apparently identical tapes, there is about a 50% chance that the tape copy will terminate prematurely." Failures such as these are usually detected only at the end of the copying operation. So 4 or 6 or more hours of machine time and tape drive usage may elapse before it is known that the copying operation failed. Whatever the failure to copy rate may be at any given installation, it is costly both in machine time as well as tape resources if any failures of this nature occur.

Finally, depending on the tape technology used, the distance from Logical End of Tape (LEOT) to Physical End of Tape, (PEOT) can vary from one tape type to another. In this case, tapes having the same physical length will have different logical capacities, depending on the placement of the LEOT marker.

One former solution to this problem was simply to use a larger capacity tape volume as the destination volume for any duplication. While this assures a high degree of success, it wastes a large amount of capacity, and restricts the choice of destination volumes to those having a larger capacity. For 8 mm tapes, this might require use of a tape with twice the capacity of the source. For example, to copy a 56 meter 8 mm tape may require using a 112 meter tape. In this latter case, nearly 50% of the capacity of the larger volume will be wasted in order to insure that complete copying occurs.

Another previous approach involved limiting the amount of data written to source volumes to some previously calculated set maximum, stopping even before the LEOT of the tape has been reached. This approach can work, however, the maximum limits usually need to be very conservative ones, and, again, the waste of media can be significant. This is because most modern tape technologies use data compression, and so it is hard to predict how much data will fit on a single volume. For example, to insure that a source tape can be copied to one volume, you may need to leave 10–25% or more of the source tape blank to insure that it can be reproduced reliably.

Tapes cost around $25 to $100 a volume, depending on the type and quantities. They also require physical storage space, either in a tape library or a computer room. Solutions that attempt to solve the problem by wasting media will incur costs in extra tapes and storage space. Solutions that don't significantly minimize the likelihood of failure can cost hours of machine time, or even, in some cases, irrecoverable database losses, since one of the most common reasons for duplicating a tape is to provide an extra copy of a critical database backup for disaster recovery purposes, the duplicate tape is stored at a disaster recovery site for use in recreating the database should fire, flood or other disasters destroy the original and the data center it resides in.

It is an object of the present invention to provide more reliably duplicatable tape volumes.

It is another object of the present invention to provide a way to duplicate tape volumes that reduces media waste and lost machine time.

SUMMARY OF THE INVENTION

These and other objects of the invention are achieved by padding the volume label on the source volume with compression resistant random data, and copying such a source volume to a tape volume that does not have padding. In a preferred embodiment, the application program creating the source volume uses the present invention to create the padding on the source volume. The amount of padding to be inserted can be specified either as a fixed amount, or as a dynamically variable parameter changed on the basis of statistically significant results sampling. When a padded source volume is then duplicated to another tape, without padding, the likelihood that the source data will "fit" on the unpadded destination volume becomes much more predictable.

It is an aspect of the present invention that it permits more reliable tape duplication without incurring significant added cost or expense.

It is another aspect of the present invention that it works with existing drive technology and input/output software drivers and label readers without requiring that they be modified.

DETAILED DESCRIPTION OF THE INVENTION

Figure 1:
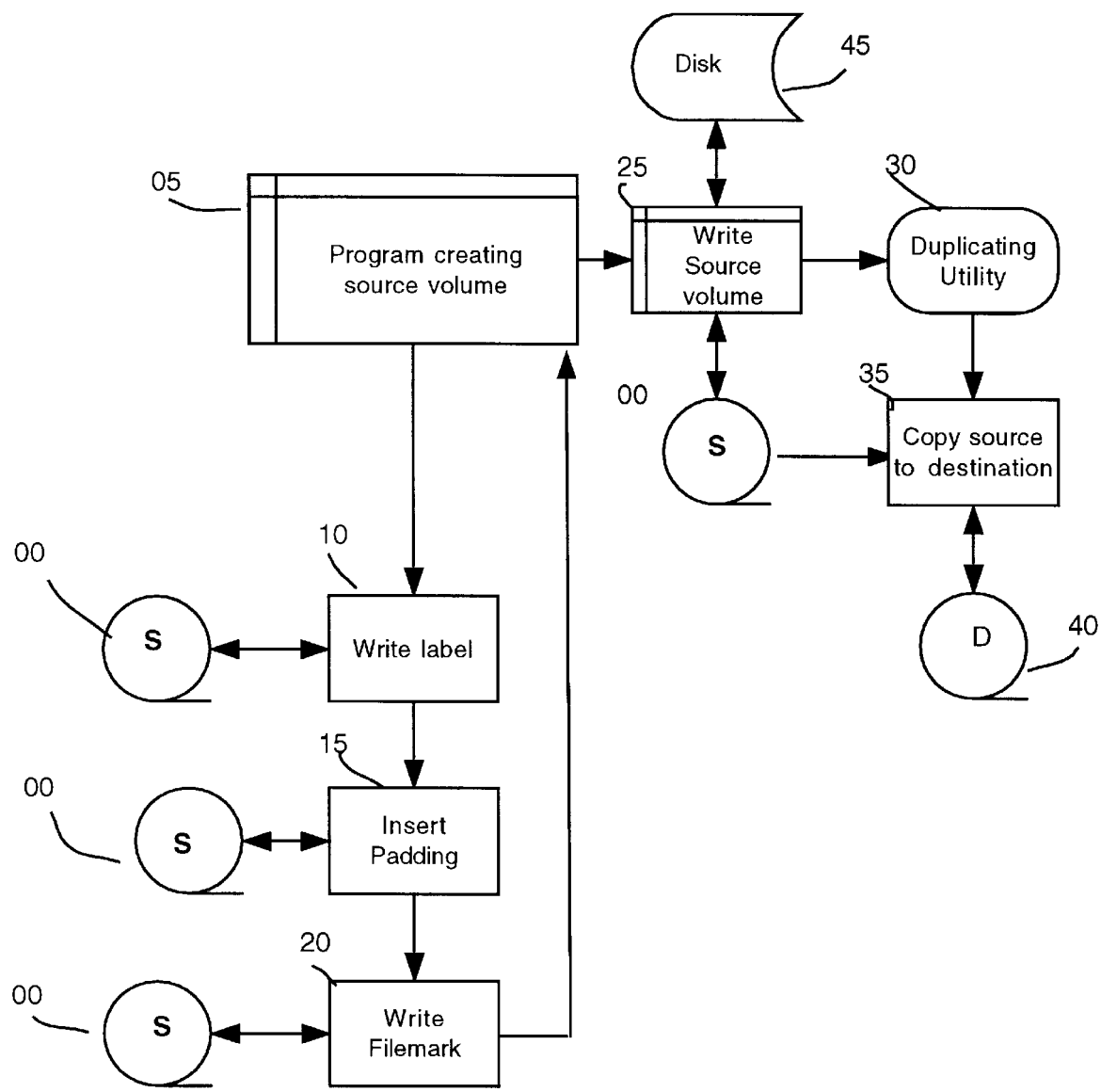
FIG. 1 is a flow diagram of the present invention.

In FIG. 1, an overall flow diagram of the method and apparatus of present invention is shown. In a preferred embodiment, the invention is invoked or called by the application program that creates source volumes. This is shown at step 05 in FIG. 1. In this illustration, source 00 is the tape to be used as the source volume. When a preferred embodiment of the present invention has been called, it first writes the label on source 00, as shown at step 10. Conventionally, this usually involves writing the first block on the tape, which is usually of a predetermined size.

Next, a preferred embodiment of the present invention, at step 15 inserts compression resistant padding data onto source 00 after the label. As will be discussed below, the length and nature of this padding data can vary depending on the user's requirements and preferences. After the padding data has been written, the invention writes a filemark, at step 20 and returns control to the program creating the source volume. Next, at step 25, the application program creating source 00, proceeds to perform its task, usually a backup of a disk file, as shown at step 25, where the contents of disk 45 are backed up onto source 00.

Now that a source 00 with padding has been created, an ordinary utility program can be used at step 30 to duplicate source 00 onto destination volume 40, with a high likelihood of success.

A preferred embodiment of the present invention works using existing software tape drivers and label readers. Most duplicating programs will not copy the label contents or padding from source 00 to destination volume 40, as destination volume 40 will have its own label. In most available utility programs, the label block on a source 00 volume is read and the utility then skips to the first filemark before copying data. Hence, the padding on source 00 is not copied to destination volume 40, and therefore the likelihood is quite high that the data on source 00 will fit on destination volume 40.

Figure 2:
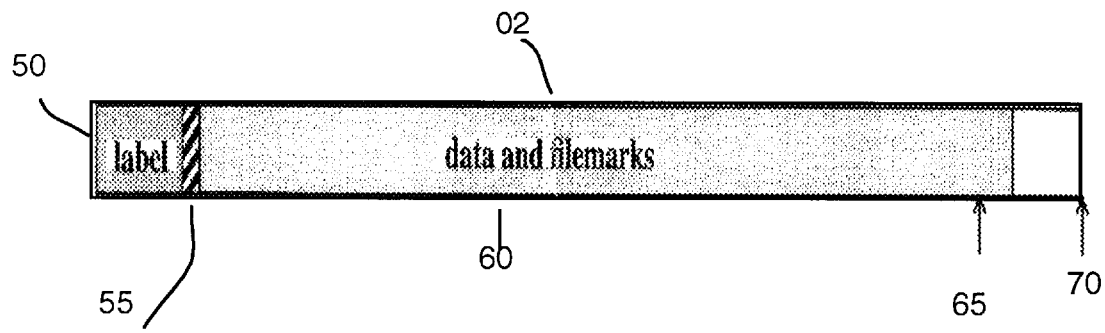
FIG. 2 is a schematic depiction of a conventional tape volume.

Turning now to FIG. 2, a conventional tape volume 02, is depicted as though it were spread out full length. Reading this drawing from left to right, tape volume 02 contains a label 50, at its leftmost, or beginning point, a filemark 55 after label 50 and then data 60 for most of its length (data 60 may consist of multiple files, each separated by filemarks as well). In the example shown, data 60, extends slightly past LEOT mark 65 on tape volume 02, but ends before the physical end of the tape, which is denoted by PEOT 70.

Figure 3A:
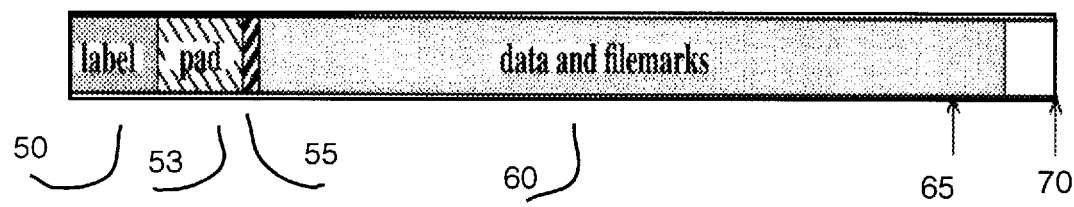
FIG. 3a is a schematic depiction of a source tape volume created according to the method and apparatus of the present invention.
Figure 3B:
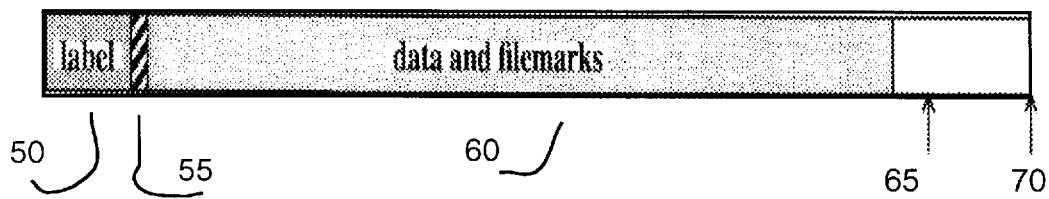
FIG. 3b is a schematic depiction of a destination volume duplicated according to the method and apparatus of the present invention.

Turning now to FIG. 3a, a source 00, created according to the method and apparatus of the present invention is shown. Here label 50 is followed by padding 53, and then by filemark 55 and data 60, and so on. When source 00 is then duplicated onto destination volume 40, as shown in FIG. 3b, padding 53 is not copied, leaving enough room on destination volume 40 for all the data 60, on source 00. Destination volume 40 will have its own label 50, followed by a filemark 55, and then the data 60 copied from source 00.

Returning to FIG. 3a, it can be seen that the size of padding 53 insures that less room remains on source 00 to hold data 60. While this results in some wastage of media, it is usually not more than 0.3 to 1.0 percent of the capacity of the medium. The exact percentage of the tape's capacity to be filled with padding 53 can vary.

Figure 4:
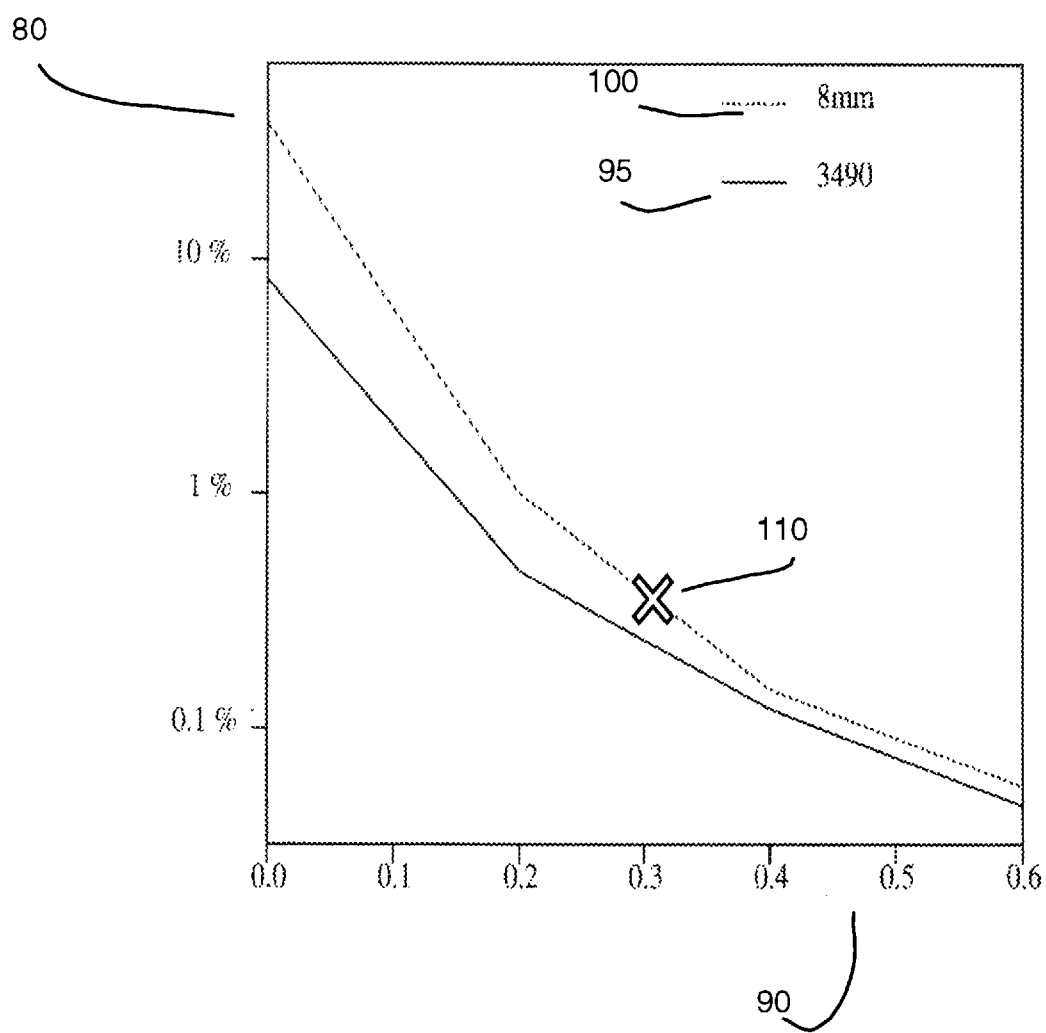
FIG. 4 is a graph of the probability of duplication failure rates at varying padding sizes according to the method and apparatus of the present invention.

Turning to FIG. 4, the graph depicted therein shows on its y-axis 80 the anticipated duplication failure rate probabilities for two types of tape media, 8mm and 3490, when the size of padding 53 is the percentage of media capacity depicted in the x-axis 90. Dotted line 95 represents the data for 8 mm tape and solid line 100 represents the data for 3490 tape.

Still in FIG. 4, using the dotted line 100 for 8mm tape, if padding 53 is sized to be about 0.3% of the media capacity, it can be seen at the x–y intersection point 110 for that sizing, that a source volume produced with that much padding will have a less than 1% chance of duplication failure. In a preferred embodiment of the present invention, the size of padding 53 can be a parameter that can be changed dynamically based on a user's results and desired reliability goals. The value can be tuned by the failure rates observed in an installation when duplicating. The percentage padding can be increased if the observed duplication reliability falls short of the goals. The parameter can be lowered if the observed reliability far surpasses acceptable reliability limits.

In a preferred embodiment, the application program that duplicates volumes could log successes or failures. At regular intervals, such as once a week or once a month, a process can analyze the log. If it determines the logged failure rate is too high, it could recommend a changed padding percentage to be used for the next interval. For the best results, the interval chosen for the log and analysis should be one that is likely to contain statistically significant data. As will be apparent to those skilled in the art, this may vary from one installation to the next.

Figure 5:
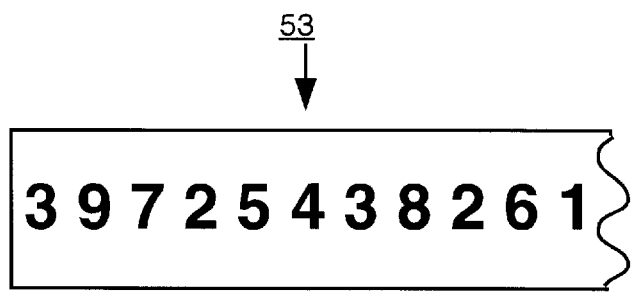
FIG. 5 is a schematic depiction of padding using a random number generator to create a compression resistant pad fill according to the method and apparatus of the present invention.

Turning now to FIG. 5, in a preferred embodiment of the present invention, padding 53 is created using a random number generator to create a compression resistant pad fill. Since many tape systems and input/output systems now provide automatic compression when writing to tape, it is important to insure that padding 53 will not be compressed but will in fact be the size required for the installation's reliability goals.

Most data compression techniques replace frequently occurring patterns, words, or redundant data with shorter symbols or tokens. Recurring patterns are the basis of most of these compression schemes. Random numbers generated by random number or pseudo-random number generating programs are much less likely to have repeating or recurring patterns, and thus produce a reasonably compression "proof" or compression-resistant fill for padding 53, as used in a preferred embodiment. Use of such random numbers for a fill also eliminates the need to turn-off or suspend any automatic compression hardware or software that is normally used. While a random number generator is used in a preferred embodiment of the present invention, any non-repeating sequence or reasonably non-repeating sequence of characters that is reasonably compression-resistant could be used to create the fill for padding 53. One advantage of using the random number generator is that it is simple to adapt it to variations in the size of padding 53, without significantly increasing the likelihood of creating a repeating pattern.

As will be apparent to those skilled in the art, however, there are many variations that could be substituted for using random numbers or non-repeating character strings. For example, instead of writing a special random number padding 53, another embodiment of the present invention could simply write the label over and over, or append the padding 53 to the label block itself, or put the pad after the first filemark, then write an additional filemark. However, in most, if not all of these alternate embodiments it would probably be necessary to modify the software that reads or duplicates tapes.

As will also be apparent to those skilled in the art, the method and apparatus of the present invention can be applied to other sequential-only access data recording media of fixed size used for duplicating, such as certain optical disks or tapes.

In a preferred embodiment, the present invention is a software program written in the C programming language that operates with backup and archival applications software used to create source volumes. As will be apparent to those skilled in the art, it could also be written in other program languages, such as C++ or assembler, or Pascal or ADA or it could be embodied as firmware or circuitry as part of a computer or tape subsystem. Alternatively, in another embodiment, it could be included with modified system and utility software as described above, if padding will be created that is not transparent to or compatible with existing label reading and utility software.

What is claimed is:

1. A method for creating reliably duplicatable sequential-only-access volumes, comprising the steps of:
   creating a source volume having a predetermined percentage of its capacity filled with padding;
   storing data on said source volume;
   copying said source volume to a destination volume, without copying any of said padding, so that said data on said source volume has a high probability of fitting onto said destination volume.

2. The method of claim 1, in which the step of creating a source volume further comprises the step of generating padding that is compression resistant.

3. The method of claim 2, in which the step of generating padding that is compression resistant includes executing a random number generator to create said padding so that operating system read and write software does not need to be modified.

4. The method of claim 2 in which the step of generating padding that is compression resistant includes writing a compression resistant data sequence as part of the operating system's read and write software.

5. An apparatus for creating reliably duplicatable sequential-only-access volumes, comprising:
   means for creating a source volume having a predetermined percentage of its capacity filled with padding;
   means for storing data on said source volume;
   means for copying said source volume to a destination volume, without copying any of said padding, so that said data on said source volume has a high probability of fitting onto said destination volume.

6. The apparatus of claim 5, in which the means for creating a source volume further comprises means for generating padding that is compression resistant.

7. The apparatus of claim 6, in which the means for generating padding that is compression resistant includes means for executing a random number generator to create said padding so that operating system read and write software does not need to be modified.

8. The apparatus of claim 6 in which the means for generating padding that is compression resistant includes means for writing a compression resistant data sequence as part of the operating system's read and write software.

* * * * *